United States Patent [19]

Kotera et al.

[11] 3,962,409

[45] *June 8, 1976

[54] PROCESS FOR PRODUCTION OF HYDROGEN AND SULFUR FROM HYDROGEN SULFIDE AS RAW MATERIAL

[75] Inventors: Yoshihide Kotera, Kawasaki; Naoyuki Todo, Tachikawa; Kenzo Fukuda, Niiza, all of Japan

[73] Assignee: Agency of Industrial Science & Technology, Tokyo, Japan

[ * ] Notice: The portion of the term of this patent subsequent to Dec. 24, 1991, has been disclaimed.

[22] Filed: Oct. 24, 1974

[21] Appl. No.: 517,656

[30] Foreign Application Priority Data

Oct. 29, 1973 Japan.............................. 48-120727

[52] U.S. Cl............................. 423/571; 423/567 R
[51] Int. Cl.²......................................... C01B 17/04
[58] Field of Search.................... 423/567, 573, 648

[56] References Cited
UNITED STATES PATENTS

| | | | |
|---|---|---|---|
| 2,979,384 | 4/1961 | Weiner et al. | 423/573 |
| 2,984,548 | 5/1961 | Massey | 423/648 X |
| 3,388,971 | 6/1968 | Schuman | 423/573 X |
| 3,856,925 | 12/1974 | Todo et al. | 423/573 X |

FOREIGN PATENTS OR APPLICATIONS

| | | | |
|---|---|---|---|
| 759,375 | 5/1967 | Canada | 423/648 |

*Primary Examiner*—G. O. Peters
*Attorney, Agent, or Firm*—Oblon, Fisher, Spivak, McClelland & Maier

[57] ABSTRACT

Sulfur and hydrogen are produced from hydrogen sulfide according to the present invention by bringing hydrogen sulfide into contact, at a temperature exceeding the boiling point of sulfur, with at least one member selected from the group consisting of the sulfides of molybdenum, tungsten and ruthenium to give rise to a gaseous mixture consisting of hydrogen sulfide, hydrogen and sulfur, cooling the produced mixture to separate therefrom the sulfur component in the condensed form and leave behind a gaseous mixture wherein the hydrogen component makes up the majority of the total weight thereof and subsequently removing hydrogen sulfide from this mixture by means of condensation or absorption.

6 Claims, 1 Drawing Figure

U.S. Patent   June 8, 1976   3,962,409
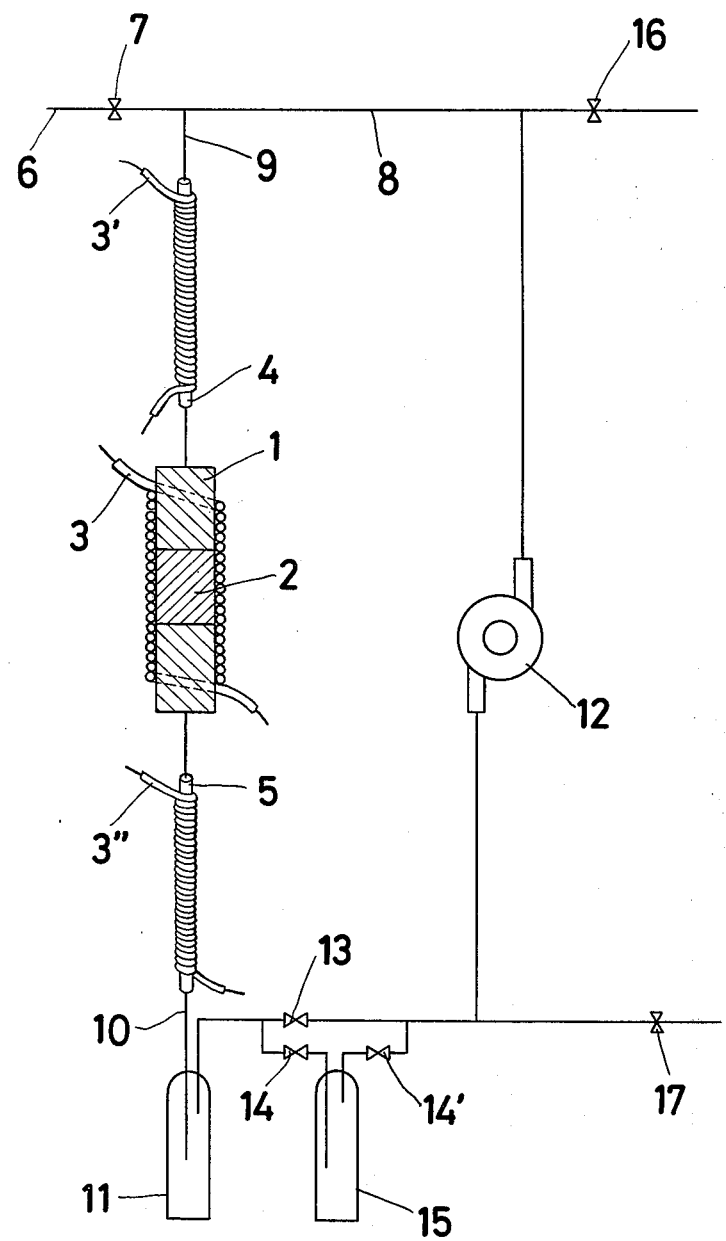

PROCESS FOR PRODUCTION OF HYDROGEN AND SULFUR FROM HYDROGEN SULFIDE AS RAW MATERIAL

BACKGROUND OF THE INVENTION

This invention relates to a process for producing sulfur and hydrogen from hydrogen sulfide by subjecting hydrogen sulfide to a decomposition reaction by use of a catalyst.

Petroleum refining processes of the type using hydrogen gas such as, for example, a process for desulfurization of crude oil or heavy oil by hydrocracking and a process for desulfurization of various petroleum fractions by hydrocracking by-produce fairly large volumes of hydrogen sulfide. There is every indication that the total volume of hydrogen sulfide thus by-produced will increase year after year in consequence of the expected increase in the size of petroleum refining facilities and in the consumption of petroleum products. In the existing petroleum refining processes, the by-produced hydrogen sulfide is generally released from the reaction systems in the form of off-gas in conjunction with other inflammable gases. The off-gas is usually used as the fuel for heating furnaces, for example. If the off-gas has a high hydrogen sulfide content, the concentration of sulfur dioxide in the waste combustion gas increases and causes environmental pollution. This necessitates separation of hydrogen sulfide from the off-gas. As concerns the separated hydrogen sulfide, the need for converting it into some other valuable substance has become pressing.

Several methods have heretofore been suggested for effective use of the by-produced hydrogen sulfide. Of these methods, the so-called Claus method or the modified Claus method is about the only one which has commercial significance at all. This method comprises the steps of separating hydrogen sulfide from the off-gas, concentrating the separated hydrogen sulfide and subsequently converting it into elementary sulfur and water through a partial oxidation treatment, as indicated by the following reaction formulas:

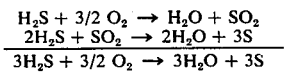

Although in this method, the sulfur component alone is recovered, the hydrogen component which is responsible for the majority of the cost incurred in the desulfurization by hydrogenation is partially discarded finally in the form of water, making the process highly uneconomical.

U.S. Pat. No. 2,979,384 teaches a method which comprises allowing a lower sulfide of iron, nickel or cobalt to react with hydrogen sulfide to produce a higher sulfide and hydrogen gas and then subjecting the produced higher sulfide to thermal decomposition to give rise to a lower sulfide and sulfur. This method, thus, involves two reactions in deriving hydrogen and sulfur from hydrogen sulfide.

Further, U.S. Pat. No. 2,839,381 granted to R. Lee and E. Grove discloses a method which comprises causing hydrogen sulfide by-produced in the reduction with hydrogen of sulfide ore to be electrolyzed in an aqueous solution containing potassium iodide and sodium iodide so as to produce hydrogen and sulfur and recycling the produced hydrogen to the process of sulfide ore reduction. For practical purpose, however, this method entails complicated steps of operation.

It is also known to the art that at elevated temperatures, hydrogen sulfide is dissociated into hydrogen and sulfur as indicated by the following formula:

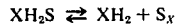

(wherein, $S_x$ denotes the allotropes of gaseous sulfur such as $S_2$, $S_6$ and $S_8$).

If the equilibrated dissociation is considered for $X = 2$, then the equilibrium constant, Kp, is $5.13 \times 10^{-3}$ for 800°K (527°C) and $2.82 \times 10^{-3}$ for 773°K (500°C). From this value of the equilibrium constant, the equilibrated hydrogen concentration at 500°C is calculated to be 0.4%. This means that 0.4% of hydrogen is produced by heating hydrogen sulfide to 500°C. In this case, however, the dissociation of hydrogen sulfide by mere application of heat proceeds with extreme slowness so that, even after about 20 hours of heating, it will not reach the stage of equilibrated hydrogen concentration. Thus, it is substantially impossible to detect any formed hydrogen in this reaction. To render this reaction commercially feasible at all, it is necessary that the reaction velocity be notably heightened.

Molybdenum sulfide ($MoS_2$) and tungsten sulfide ($WS_2$), which are used for the present invention are adpoted as shown below, either by themselves or in the form of mullti-component catalysts (frequently supported on alumina or silica-alumina) having nickel sulfide or cobalt sulfide combined therewith. For example, they are used as catalysts in the hydrocracking of various petroleum fractions by U.S. Pat.. No. 3,267,021, as catalysts in the cracking by U.S. Pat. Nos. 3,340,422 and 3,475,325 and as catalysts in the desulfurization of heavy oil, etc. None of them, however, has ever found utility in the decomposition of hydrogen sulfide, by one step, into hydrogen and elementary sulfur.

An object of this invention is to provide an improved commercially useful process for the production of hydrogen and sulfur by the decomposition of hydrogen sulfide. Another object of this invention is to provide an improved commercially useful process for the continuous production of hydrogen and sulfur by the decomposition of hydrogen sulfide.

SUMMARY OF THE INVENTION

To attain the objects described above, the process according to the present invention produces hydrogen and sulfur from hydrogen sulfide by the steps of bringing hydrogen sulfide gas into contact, at a temperature exceeding the boiling point of sulfur, with at least one member selected from the group consisting of the sulfides of molybdenum, tungsten and ruthenium to give rise to a gaseous mixture consisting of hydrogen sulfide, hydrogen and sulfur, cooling this gaseous mixture for thereby condensing the sulfur and removing therefrom the sulfur condensate, circulating the remaining gaseous mixture into contact with the aforementioned sulfide for thereby further decomposing hydrogen sulfide to produce hydrogen and sulfide and consequently produce a gaseous product containing hydrogen at a higher concentration and finally isolating hydrogen from the gaseous product.

In the process of this invention described above, part of the circulation gas is taken out of the reaction system continuously or intermittently and it is separated into hydrogen and hydrogen sulfide. The hydrogen thus separated is obtained as a final product. The hydrogen sulfide which remains after the separation of hydrogen is recycled as the starting material. The present invention also embraces the process wherein an amount of hydrogen sulfide equivalent to the hydrogen sulfide consumed due to the said reaction is supplied to the recycled hydrogen sulfide.

Other characteristics and other advantages of the present invention will become apparent from the description to be given herein below with reference to the accompanying drawing.

BRIEF EXPLANATION OF THE DRAWING

The drawing is a diagram illustrating one preferred embodiment of the apparatus employed for practicing the present invention.

DETAILED DESCRIPTION OF THE INVENTION

This invention, as the first step, causes hydrogen sulfide to be brought into contact at a temperature exceeding the boiling point of sulfur with at least one member selected from the group consisting of the sulfides of molybdenum, tungsten and ruthenium. Contact of hydrogen sulfide with cobalt sulfide, nickel sulfide, iron sulfide, titanium sulfide, vanadium sulfide, chromium sulfide, etc. also serves the purpose of accelerating the decomposition of hydrogen sulfide into sulfur and hydrogen. In other words, the three specific sulfides which are used for the process of this invention are as effective in catalytic function as the other sulfides just described. The difference is that the sulfides other than those prescribed by this invention are deprived of their catalytic activity after certain lengths of service, whereas the three specific sullfides mentioned above maintain their activity perfectly intact over a long time of use and therefore permit continued use. In the process of this invention, when hydrogen sulfide is brought into contact with at least one of the three prescribed sulfides at a temperature exceeding the boiling point of sulfur, the decomposition of hydrogen sulfide is accelerated greatly to produce, in high yields, a gaseous mixture containing hydrogen sulfide, sulfur and hydrogen. When this gaseous mixture is subsequently cooled to about 30°C, for example, the sulfur component alone is condensed. The gaseous mixture which remains after removal of the condensed sulfur is recycled and again brought into contact with the aforementioned catalyst at the elevated temperature. Consequently, the hydrogen sulfide component of this mixture undergoes the same decomposition reaction as described above and gives rise to sulfur and hydrogen, producing the same gaseous mixture as mentioned above. As this cycle of operation is repeated, the hydrogen concentration in the gas is gradually increased. As the catalyst for the process of this invention, a substance as in a metallic form or a oxide form which can be sulfurized into one of the three prescribed sulfides may be packed in advance in the reaction apparatus and thereafter sulfurized in situ into the sulfide. The sulfides of tungsten and molybdenum are generally used in the form of disulfides. To serve as the catalyst, the sulfide may be used in its unsupported granular form or it may be supported on a suitable carrier.

The decomposition of hydrogen sulfide is an endothermic reaction and the equilibrium constant involved therein is fairly large at high temperatures. This means that the more the temperature at which hydrogen sulfide is brought into contact with the catalyst increases, the more advantageous will it prove for the decomposition. From the practical standpoint, however, since hydrogen sulfide is a corrosive gas, it causes the phenomenon of dry corrosion on the apparatus. This dry corrosion gains in severity in proportion as the temperature of the apparatus increases. The apparatus currently available for this process is geneally made of Pyrex glass, stainless steel or alloy such as of Inconel. Therefore, the highest practical temperature of the reaction tolerable for such apparatus is 1000°C, preferably about 800°C. On the other hand, the lower limit of the temperature must be higher than the boiling point of sulfur, because the formed sulfur is required to remain in a gaseous state. To ensure a commercially acceptable conversion in the decomposition, therefore, the temperature is desired to be over 450°C.

Continued removal of the formed sulfur from the reaction system is an indispensable requirement for the purpose of maintaining a high conversion in the decomposition occurring between hydrogen sulfide and the catalyst held in contact therewith. This removal is easily accomplished by cooling the gas immediately after contact thereof with the catalyst.

When hydrogen sulfide is brought into contact with at least one member selected from the group consisting of the sulfides of molybdenum, tungsten and ruthenium and, at the same time, the formed sulfur is removed as it occurs in the system, the hydrogen concentration in the circulation gas gradually increases as the circulation of the gas is repeated.

Then from the gaseous mixture wherein the hydrogen concentration has increased because of the repeated circulation, the hydrogen component alone is removed. Since the gaseous mixture at this stage contains hydrogen sulfide component alone besides the hydrogen component, this separation of hydrogen is accomplished by removing hydrogen sulfide from the mixture. The removal of hydrogen sulfide is mdade by condensation or by absorption by, for example, resorting to the amine absorption method. Hydrogen sulfide boils at −59.6°C and melts at −82.9°C and, therefore, can easily be condensed by cooling. It can otherwise be removed by passing the gaseous mixture through an absorbent such as an aqueous solution of organic amine, for example, diethanolamine.

The gas which remains after removal of the hydrogen sulfide component consists solely of hydrogen. Thus, this gas can be obtained as a final product without further treatment. The hydrogen sulfide which has been removed in a condensed state is readily gasified. The hydrogen sulfide which has been removed by absorption is easily separated from the absorbent by utilizing the effect of temperature change upon the absorption-desorption equilibrium. Thus, the removed hydrogen sulfide is readily recovered in a gaseous state and delivered for further production of sulfur and hydrogen.

The present invention also provides a process by which the formed hydrogen is removed continuously or intermittently from the gaseous mixture and the remaining gas consisting solely of hydrogen sulfide is brought into contact with the catalyst to undergo the decomposition. The fact that this process enjoys added efficiency will be explained below.

Hydrogen sulfide in its initially delivered form is now assumed to have a concentration of unity (1). It is then assumed to undergo a process in which it is first decomposed, the sulfur formed in consequence of the decomposition is continuously removed from the reaction mixture and the gas remaining after the removal of sulfur is continuously circulated back into contact with the catalyst to establish a new equilibrium. The following table shows how molar concentrations of hydrogen sulfide and hydrogen vary after successive cycles of passage through the catalyst bed when the decomposition is effected at 500°C.

Table 1

| Cycle of passage through catalyst bed | Unaltered $H_2S$ | Formed $H_2$ |
| --- | --- | --- |
| 0 | 1 | 0 |
| 1 | 0.9960 | $4.00 \times 10^{-3}$ |
| 2 | 0.9929 | 7.11 " |
| 3 | 0.9910 | 9.03 " |
| 4 | 0.9896 | 10.45 " |
| 5 | 0.9884 | 11.61 " |
| 6 | 0.9874 | 12.59 " |
| 7 | 0.9866 | 13.44 " |
| 8 | 0.9858 | 14.21 " |
| 9 | 0.9851 | 14.89 " |

The table clearly shows that so long as hydrogen remains unremoved in the reaction mixture, the conversion by the passage through the catalyst bed continues to decline with the increasing number of cycles. If hydrogen is removed in conjunction with sulfur, then the conversion ought to assume the same value in every successive cycle as in the first cycle. To obtain hydrogen advantageously, therefore, it is desirable that the formed hydrogen be intermittently or continuously separated from the reaction gas and taken out of the reaction system.

Commercially feasible continuous operation of the present invention can be accomplished perfectly by effecting the separation of sulfur in the same way as by the aforementioned process and carrying out the separation of hydrogen as indicated below: Part of the gas under circulation is taken out continuously and then separated into hydrogen sulfide and hydrogen in the same way as described above to obtain the separated hydrogen as a final product and the remaining hydrogen sulfide is supplied, in conjunction with freshly supplied hydrogen sulfide, to the catalyst.

Now, the working of the present invention will be described in further detail with reference to the accompanying drawing.

Numeral symbol 1 denotes a reactor for the decomposition. A required amount of catalyst 2 is packed in the form of a layer inside the reactor. A heating coil 3 is adapted to heat the reactor externally. Denoted by 4 is a preheater connected to the anterior extremity of the reactor. The preheater 4 is maintained by a heating coil 3' at temperatures in the range of from 450° to 700°C. A postheater 5 which is connected to the posterior extremity of the reactor is adapted to be heated to the neighborhood of 180° to 250°C by a heating coil 3'' so as to keep the sulfur component in the produced reaction gas from being condensed. The preheater 4, the reactor 1 and the post-heater 5 are made of Pyrex glass, stainless steel or alloy such as Inconel and constitute in their combined form a system for converting hydrogen sulfide into gaseous sulfur and hydrogen.

Hydrogen sulfide as the raw material is forwarded in a suitable amount under normal pressure or reduced pressure through a pipe 6 and a valve 7 and introduced, in conjunction with the circulation gas received through a pipe 8, into the preheater 4 via a feed pipe 9. The decomposition involved in the process of this invention need not be performed under an increased pressure, because the decomposition is of a type which results in an increase in the mol number. After a prescribed amount of hydrogen sulfide has been introduced into the reaction system, the valve 7 is closed to seal hydrogen sulfide inside the reaction system. It is then circulated by a circulation pump 12 through the system to be passed through the catalyst bed 2 repeatedly. The reaction gas which has departed from the reactor 1 is sent through the post-heater 5 which is heated to about 180° to 250°C to prevent the gaseous sulfur from being condensed on the inner wall of the reaction system. After its travel past the post-heater, it is led via a pipe 10 into a sulfur condenser 11. At the sulfur condenser 11, the sulfur component is removed to be captured in the form of elementary sulfur from the unaltered hydrogen sulfide and the formed hydrogen. As the hydrogen concentration in the reaction gas has increased to a certain extent, valves 13, 14 and 14' are so adjusted as to have the reaction gas pass a hydrogen sulfide condenser 15, with the result that the gas is separated into hydrogen sulfide and hydrogen. The hydrogen separated from hydrogen sulfide is drawn past a vlave 16 into a hydrogen reservoir. Thereafter, a fresh supply of hydrogen sulfide is introduced through the valve 7 to make up for shortage of hydrogen sulfide supply resulting from the reaction. Then, the aforementioned procedure is repeated on the replenished hydrogen sulfide. The gas being circulated within the reaction system is drawn through a valve 17 at suitable intervals to be analyzed by gas chromatography.

This reaction system enables the reaction contemplated by this invention to be carried out continuously. To be specific, after the hydrogen concentration in the gas under circulation has reached a prescribed level, hydrogen sulfide is continuously supplied at a suitable flow rate into the reaction system through the valve 7 and, at the same time, the circulation gas consisting preponderantly of hydrogen sulfide and hydrogen is continuously drawn out at a corresponding flow rate through a valve 16. The circulation gas thus drawn out is treated to separate and obtain hydrogen gas.

Now, the effect of the present invention will be demonstrated with working examles to be cited herein below. It should be understood that the present invention is not limited to these examples. In all the examples cited, an apparatus of the design illustrated in the attached drawing was employed.

EXAMPLE 1

In the reactor, 27.1g of unsupported molybdenum sulfide (1 to 2mm in diameter) was placed and maintained at 500°C. The preheater was kept at 450°C at the same time. Within the reaction system was sealed 104.7ml (s.t.p.) of hydrogen sulfide, which was circulated by the circulation pump so as to be passed through the catalyst bed repeatedly at a rate of 2.6 times per minute. After 17.5 hours of this treatment, the hydrogen concentration reached 19.5% and the amount of hydrogen present 15.9ml (s.t.p.) respectively. The elementary sulfur collected by that time in the sulfur condenser totalled to 20mg. Since this amount of sulfur corresponds to 14 ml (s.t.p.) of hydrogen, it is learnt that the sulfur as simple substance was recovered substantially in a stoichiometric proportion. The slight difference noted to exist between the amount of $H_2S$ introduced into the reaction system and the amount of formed hydrogen and the hydrogen concentration was due to adsorption or occlusion by the catalyst of hydrogen sulfide (or hydrogen). An X-ray diffraction analysis conducted on the catalyst at the end of the reaction revealed that the catalyst had entirely the same crytalline structure of $MoS_2$ as prior to the start of the reaction, indicating that the catalyst remained perfectly intact throughout the reaction.

COMPARATIVE EXAMPLE 1

Decomposition of hydrogen sulfide was tried by faithfully repeating the procedure of Example 1, except for omission of the placement of a catalyst bed within the reactor. After 26 hours of the treatment, only traces of formed hydrogen were recognized in the system.

EXAMPLE 2

In the reaction system was sealed 122.6ml (s.t.p.) of hydrogen sulfide as the raw material, with 27.6g of unsupported molybdenum sulfide (1 to 2mm in diameter) used as the carrier and the reaction temperature kept at 450°C. The reaction gas was circulated so that it passed through the catalyst bed at a rate of 2.6 times per minute so as to effect decomposition of hydrogen sulfide. After 21 hours of this treatment, the hydrogen concentration rose to 9.7% and the absolute amount of hydrogen totalled to 8.9ml (s.t.p.). The elementary sulfur collected within the sulfur condenser totalled to 11.5mg, a value corresponding to 8.1ml (s.t.p.) of hydrogen. The results, therefore, indicate that the hydrogen sulfide in the gaseous phase was substantially stoichiometrically decomposed to produce hydrogen and elementary sulfur.

EXAMPLE 3

In the reaction system, 132.8ml (s.t.p.) of hydrogen sulfide as raw material was sealed, with 26.8g of unsupported molybdenum sulfide deposited in position as the catalyst and the reaction temperature fixed at 550°C. The reaction gas was circulated so as to be passed through the catalyst bed at a rate of 0.9 time per minute, with the result that hydrogen sulfide was decomposed. After 12.5 hours of this treatment, the hydrogen concentration reached 19.7% and the absolute amount of formed hydrogen 20.0ml (s.t.p.) respectively. In the sulfur condenser, the amount of elementary sulfur collected by this time was 29mg, a value corresponding to 20.3ml of hydrogen (s.t.p.). The results, therefore, indicate that hydrogen sulfide was stoichiometrically decomposed into hydrogen and elementary sulfur. The X-ray diffraction analysis conducted on the catalyst at the end of the reaction revealed that at the reaction temperature of the present example, the catalyst retained substantially the same crystalline structure as prior to start of the reaction, indicating that the catalyst remained perfectly intact throughout the reaction.

COMPARATIVE EXAMPLE 2

Hydrogen sulfide was decomposed under entirely the same conditions as in Example 3, except for omission of the use of the catalyst in the reaction system. Even after 14 hours of the treatment, the hydrogen concentration was barely 5%.

EXAMPLE 4

Into the reaction system was introduced 322.8ml (s.t.p.) of hydrogen sulfide as the raw material, with 38.5g of unsupported molybdenum sulfide ($WS_2$, 1 to 2mm in diameter) used as the catalyst and the decomposition was carried out at a reaction temperature of 500°C. The velocity of reaction gas circulation was the same as in Example 1. In this case, about 83% of hydrogen sulfide introduced into the reaction system was adsorbed onto or occluded into the catalyst and about 17% of the hydrogen sulfide remained as a gas. The remaining hydrogen sulfide was circulated through the catalyst bed in the reaction system. After 21 hours of this circulation treatment, the hydrogen concentration reached 15.0% and the absolute amount of formed hydrogen 5.8ml (s.t.p.). In the sulfur condenser, the amount of elementary sulfur collected by this time was 8mg, a value corresponding to 5.6ml (s.t.p.) of hydrogen. The results, therefore, indicate that the remaining hydrogen sulfide was stoichiometrically decomposed into hydrogen and elementary sulfur being equal in molar ratio to each other.

EXAMPLE 5

A fixed amount of hydrogen sulfide was sealed in the reaction system, with 26.8g of unsupported molybdenum sulfide ($MoS_2$, 1 to 2mm in diameter) used as the catalyst and the reaction temperature kept at 550°C. The reaction gas was circulated to pass through the catalyst bed at a rate of 0.9 time per minute to effect decomposition of hydrogen sulfide. At the end of 4 hours of this treatment, the reaction gas was separated into hydrogen sulfide and hydrogen in the hydrogen sulfide condenser. The hydrogen thus separated was transferred into the reservoir and removed from the reaction system. The remaining hydrogen sulfide was combined with freshly supplied hydrogen sulfide and substantially the same amount of the resultant hydrogen sulfide as used in the initial delivery was sealed in the reaction system. Then, decomposition of hydrogen sulfide was carried out by following the procedure faithfully. The same operation was carried out in a total of five cycles. The results were as shown in Table 2. The results show that 46.2% of all the hydrogen sulfide introduced into the reaction system was converted into hydrogen.

Table 2

| Cycle | 1 | 2 | 3 | 4 | 5 |
| --- | --- | --- | --- | --- | --- |
| Amount of $H_2S$ introduced (ml)(s.t.p.) | 107.7 | — | — | — | — |
| Added $H_2S$ (ml)(s.t.p.) | — | 19.0 | 8.9 | 15.8 | 17.0 |
| Accumulated $H_2S$ (ml)(s.t.p.) | 107.7 | 126.7 | 135.6 | 151.4 | 168.4 |
| Reaction time | 4 | 4 | 4 | 4 | 4 |
| Hydrogen concentration(%) | 14.0 | 12.4 | 15.1 | 15.2 | 15.1 |

Table 2-continued

| Cycle | 1 | 2 | 3 | 4 | 5 |
|---|---|---|---|---|---|
| Amount of hydrogen (ml) (s.t.p.) | 15.0 | 14.0 | 16.2 | 16.3 | 16.3 |
| Accumulated H$_2$ (ml) (s.t.p.) | 15.0 | 29.0 | 45.2 | 61.5 | 77.8 |
| Conversion to H$_2$ based on accumulated H$_2$S (%) | 13.9 | 22.9 | 33.3 | 40.6 | 46.2 |

In Example 3, the conversion to hydrogen based on the hydrogen sulfide as the raw material was 15.1% when the reaction was continued for 12.5 hours without involving separation of hydrogen and hydrogen sulfide. In the present example, separation of hydrogen sulfide and hydrogen and removal of hydrogen from the reaction system were carried out at respectively fixed intervals. Within substantially the same time (by the third cycle), the conversion to hydrogen based on hydrogen sulfide as the raw material was 33.3%.

After a total of five cycles of reaction, the elementary sulfur collected within the sulfur condenser amounted to 111mg a value corresponding to 77.7ml (s.t.p.) of hydrogen. The results, therefore, indicate that hydrogen sulfide was decomposed stoichiometrically into hydrogen and elementary sulfur.

EXAMPLE 6

A stated amount of hydrogen sulfide was sealed in the reaction system, with 19.7g of unsupported molybdenum sulfide (MoS$_2$, 1 to 2mm in diameter) deposited in position as the catalyst and the reaction temperature fixed at 800°C. The reaction gas was circulated so as to be passed through the catalyst bed at a rate of 0.9 time per minute to effect decomposition of hydrogen sulfide. For the first time, a part of the reaction gas was separated in the hydrogen sulfide condenser into hydrogen sulfide and hydrogen by the end of 3.5 hours of reaction. The same separation was carried out for the second and the third time respectively at intervals of 2 hours thereafter. Each time, the separated hydrogen was transferred into the reservoir and removed from the reaction system. The remaining hydrogen sulfide was combined with a fresh supply of hydrogen sulfide and substantially the same amount of hydrogen sulfide was sealed in the reaction system and subjected to entirely the same procedure as in the first time to effect decomposition of hydrogen sulfide. A total of three cycles of operation were carried out. The results were as shown in Table 3. The results indicate that 80.4% of the entire hydrogen sulfide introduced into the reaction system was converted into hydrogen.

Table 3

| Cycle | 1 | 2 | 3 |
|---|---|---|---|
| Amount of H$_2$S introduced (ml) (s.t.p.) | 98.2 | — | — |
| Added H$_2$S (ml) (s.t.p.) | — | 55.9 | 62.4 |
| Accumulated H$_2$S (ml) (s.t.p.) | 98.2 | 154.1 | 216.5 |
| Reaction time | 3.5 | 2.0 | 2.0 |
| Hydrogen concentration (%) | 71.1 | 59.9 | 58.2 |
| Amount of hydrogen (ml) (s.t.p.) | 71.5 | 61.3 | 69.6 |
| Amount of H$_2$ separated and removed (ml) (s.t.p.) | 56.2 | 48.2 | — |
| Accumulated H$_2$ (ml) (s.t.p.) | 71.5 | 117.5 | 174.0 |
| Conversion to H$_2$ based on accumulated H$_2$S (%) | 72.8 | 76.2 | 80.4 |

When the same reaction was continued for 7.5 hours without separating and removing hydrogen, under entirely the same conditions as in the first cycle of operation shown in Table 3 except for the length of reaction time, the hydrogen concentration reached 80.0% and the amount of formed hydrogen 78.6 ml (s.t.p.) respectively. Compared with the results obtained in the case in which the separation and removal of formed hydrogen and the replenishment of hydrogen sulfide with a new supply performed for two more cycles, the conversion to hydrogen based on the whole amount of hydrogen sulfide supplied to the reaction system was practically the same while the whole amount of hydrogen sulfide treated and the whole amount of hydrogen obtained were greater by 2.2 times.

EXAMPLE 7

At 500°C, 3.0g of ruthenium supported on barium sulfate (supported amount 5% by weight) was thoroughly pre-sulfurized with a current of hydrogen sulfide. Then, hydrogen sulfide was decomposed by use of a circulation type reaction system. The amount of hydrogen sulfide sealed in the reaction system was 105.0ml(s.t.p.) and the velocity of reaction gas circulation was the same as in Example 1. At the end of 20 hours of this treatment, the hydrogen concentration reached 16.3% and the absolute amount of formed hydrogen 13.3ml (s.t.p.) respectively. The amount of elementary sulfur collected by this time within the sulfur condenser was 18.0mg, a value corresponding to 12.6ml (s.t.p.) of hydrogen. The results, therefore, indicate that hydrogen sulfide was stoichiometrically decomposed into hydrogen and elementary sulfur.

What is claimed is:

1. In a process for the production of hydrogen and sulfur from hydrogen sulfide, the improvement which comprises:
    1. bringing hydrogen sulfide into contact with at least one member selected from the group consisting of the sulfides of molybdenum, and ruthenium at a temperature of from 450°–800°C thereby giving rise to a gaseous mixture consisting of hydrogen sulfide, hydrogen and sulfur,
    2. cooling the said gaseous mixture thereby condensing the sulfur component of the said mixture and separating and obtaining elementary sulfur,
    3. circulating back to the step (1) above the gaseous mixture remaining after removal of sulfur, 4. subjecting the circulated gaseous mixture to the steps (2) and (3) above continuously and recurrently for thereby forming a gaseous mixture having an increased hydrogen content and
5. separating the hydrogen component from the gaseous mixture having an increased hydrogen content.

2. The process of claim 1, wherein the separation of hydrogen is accomplished by cooling the circulating gas to condense hydrogen sulfide and removing the condensed hydrogen sulfide from the gas consequently to leave behind hydrogen alone in the gaseous state.

3. The process of claim 1, wherein the separation of hydrogen is accomplished by passing the circulating gas through a solution capable of absorbing hydrogen sulfide alone for thereby having the hydrogen sulfide component alone absorbed in the said absorbent solution and allowing the hydrogen component alone to be obtained in the gaseous state.

4. In a process for the continuous production of hydrogen and sulfur from hydrogen sulfide, the improvement which comprises:
1. continuously bringing hydrogen sulfide into contact with at least one member selected from the group consisting of the sulfides of molybdenum, and ruthenium at a temperature of from 450°–800°C for thereby giving rise to a gaseous mixture consisting of hydrogen sulfide, hydrogen and sulfur;
2. continuously cooling the said gaseous mixture thereby continuously condensing the sulfur component of the said mixture and continuously separating and obtaining elementary sulfur,
3. continuously withdrawing a part of the gaseous mixture remaining after removal of the condensed sulfur and, at the same time, circulating the remaining part of the gaseous mixture back to the step (1) above;
4. separating and obtaining hydrogen from the withdrawn part of the gaseous mixture and
5. circulating back to the step (1) above the hydrogen sulfide resulting from the said separation of hydrogen and introducing into the said step (1) such amount of fresh hydrogen sulfide as to make up for the hydrogen sulfide lost from the circulation gas in consequence of the reaction.

5. The process of claim 4, wherein the separation of hydrogen is accomplished by cooling the withdrawn gaseous mixture for thereby condensing the hydrogen sulfide component thereof and enabling the hydrogen component alone to be obtained in the gaseous state.

6. The process of claim 4, wherein the separation of hydrogen is accomplished by passing the withdrawn gaseous mixture through a solution capable of absorbing hydrogen sulfide alone thereby having the hydrogen sulfide component alone absorbed in the said absorbent solution and allowing the hydrogen component alone to be obtained in the gaseous state.

* * * * *